United States Patent [19]

Swanson et al.

[11] 4,277,386

[45] Jul. 7, 1981

[54] ADHESIVE COMPOSITION

[75] Inventors: Michael E. Swanson, Granville; Sanford K. Lauderback, Newark, both of Ohio

[73] Assignee: Owens-Corning Fiberglas Corporation, Toledo, Ohio

[21] Appl. No.: 179,333

[22] Filed: Aug. 18, 1980

Related U.S. Application Data

[63] Continuation-in-part of Ser. No. 79,398, Sep. 27, 1979, abandoned.

[51] Int. Cl.$^3$ ................................................ C08K 3/28
[52] U.S. Cl. ........................ 260/29.6 RW; 260/29.6 M
[58] Field of Search ................ 260/29.6 H, 29.6 RB, 260/29.6 RW, 29.6 M, 29.6 MM

[56] References Cited

U.S. PATENT DOCUMENTS

| | | | |
|---|---|---|---|
| 3,644,262 | 2/1972 | Stehle | 260/29.6 RW |
| 3,812,072 | 5/1974 | Kuhlkamp | 260/29.6 RW |
| 3,819,542 | 6/1974 | Kreider | 260/29.6 RW |
| 4,098,746 | 7/1978 | Becker | 260/29.6 RW |
| 4,118,356 | 10/1978 | Devona | 260/29.6 RW |

*Primary Examiner*—Paul R. Michl
*Attorney, Agent, or Firm*—Ronald C. Hudgens; Philip R. Cloutier

[57] ABSTRACT

An adhesive composition comprising carboxylated vinyl acetate-ethylene latex, a non-carboxylated vinyl acetate-ethylene latex and ammonium dichromate is disclosed.

8 Claims, No Drawings

ADHESIVE COMPOSITION

This is a continuation-in-part of Ser. No. 079,398 filed Sept. 27, 1979 now abandoned.

BACKGROUND OF THE INVENTION

This invention pertains to adhesives and, in particular, to adhesives suitable for adhering metallic foils to fiber glass substrates.

In one of its more specific aspects, this invention pertains to adhesive compounds employing vinyl acetate-ethylene copolymers as their base.

The use of adhesives for adhering metallic foils to fiber glass substrates is well known. Particular among such uses are those involving the adhesion between aluminum foil and fiber glass scrim as embodied in duct board. There has now been discovered an adhesive which is particularly effective in such applications.

SUMMARY OF THE INVENTION

According to this invention there is provided an adhesive composition comprising a carboxylated vinyl acetate-ethylene latex and a non-carboxylated vinyl acetate-ethylene latex.

DESCRIPTION OF THE PREFERRED EMBODIMENT

The carboxylated vinyl acetate-ethylene latex is employed in an amount within the range of from about 29 to about 67 parts by weight per 100 parts by weight of the composition (pbw). In the preferred embodiment of the invention, this latex will be employed in an amount of about 48 pbw. In its preferred form, this latex will be Airflex 416 as produced by Air Products and Chemicals.

The terpolymer contained in the latex, Airflex 416, as produced by Air Products and Chemicals, is produced employing from about 20 to 25 weight percent ethylene, 75 to 80 weight percent vinyl acetate and about 2 weight percent methacrylic acid and that Airflex 416 contains about 52 weight percent solids.

The non-carboxylated vinyl acetate-ethylene latex is employed in an amount within the range of from about 27 to about 64 pbw. In the preferred embodiment, this latex will be employed in an amount of about 46 pbw. In its preferred form, this latex will be Airflex 400 as produced by Air Products and Chemicals.

The copolymer contained in the latex, Airflex 400, as produced by Air Products and Chemicals, is produced employing from about 20 to about 25 weight percent ethylene and 75 to 80 weight percent vinyl acetate and that Airflex 400 contains about 55 weight percent solids.

The adhesive composition will, in its preferred embodiment, comprise ammonium dichromate in an amount within the range of from about 0.25 to about 0.75 pbw, preferably about 0.50 pbw; and polyethylene oxide (as a 10% aqueous solution) in an amount within the range of from about 3.33 to about 4.8 pbw, preferably about 4.3 pbw. The latter is available as Polyox WSR N-750 from Union Carbide.

In addition, the composition will comprise 10,10'-oxybisphenoxarsine emulsion (2% active) in an amount within the range of from about 0.85 to about 0.95 pbw. This emulsion is commercially obtainable as Durotex 7603 from Ventron Corp.

Also, the composition will comprise 2,4,7,9-tetramethyl-5-decyn-4,-7-diol in an amount within the range of from about 0.57 to about 0.77 pbw, preferably about 0.67 pbw. This material is commercially obtainable as Surfynol 104H from Air Products and Chemicals, Inc.

EXAMPLE I

The adhesive composition of this invention was prepared according to the following procedure:

2,500 pounds of Airflex 416 were added to a stainless steel mixing tank and the mixture was agitated to a point just short of vortex formation during this, and subsequent, additions.

While agitating, 2,362 pounds of Airflex 400 were added.

When mixing was complete, 34 pounds of Surfynol 104H were added during a one minute period. Then, 49 pounds of Durotex 7603 were added during a two minute period. Thereafter, 200 pounds of a 10% aqueous solution of Polyox WSR N-750 were added during a five minute period. Agitation was then continued for 30 minutes.

The viscosity of the resulting mixture should be within the range of about 1700 to 2200 cps. (Brookfield RVT, #4 spindle, 20 RPM, 77° F.) If the viscosity is less than 1700 cps, additional quantities of Polyox solution in 25 pound increments should be added, mixing being conducted for 15 minutes thereafter before again checking the viscosity of the mixture. Just prior to use, about 2.3 pounds of ammonium dichromate should be added to each 450 pounds of the mixture, with the resulting mixture being stirred for about 15 minutes.

The adhesive of this invention is applied to duct board in the usual manner, employing a dry application rate of about 3.5 grams per square foot. Oven drying is conducted in the usual manner at a temperature within the range of from about 250° F. to about 475° F.

EXAMPLE II

The adhesive of this invention was employed to adhere foil to duct board. The resulting product, 1400 FR, had the following properties after the facing was slit lengthwise and taped with Nashua #324 pressure sensitive aluminum tape:

| Flame Spread | Smoke Developed* |
| --- | --- |
| 20* | 0 |

*ASTM E84-74 Tunnel Tests. Average of three burns.

EXAMPLE III

This example presents adhesion and other results of faced duct board testing under the application conditions indicated employing adhesive which had been aged for two months.

| Sample No. | Product | Application Rate, g./sq.ft. (dry) | Retained Moisture, g./sq.ft. | Pre-track Oven (°F.) | Drying Oven, (°F.) | Line Speed, FPM |
| --- | --- | --- | --- | --- | --- | --- |
| 1 | 1400 FR* | 3.4 | 0.1 | 260 | 420 | 84 |
| 2 | 475 FRK** | 3.0 | 0.4 | 220 | 320 | 120 |

*6 ¼#/cu.ft. duct board, foil reinforced, min.; average structural rigidity = 1400 in.$^2$ lbs./in. of width. OCF Standard Product
**Foil Reinforced Kraft. OCF Standard Product.

Further test results on this material were as follows:

| Sample Number | Product | Criteria | Peel Adhesion | | |
|---|---|---|---|---|---|
| | | | As Received Wool Pull | Humidity Cabinet Wool Pull | Cold Temp. Wool Pull |
| 1 | 1400FR* | Minimum 50% Wool Coverage Overall And Along Edges | 90% | 85% | 85% |
| 2 | 475FRK** | | 90% | 90% | 95% |

| Sample Number | Product | Criteria | Suction Box | |
|---|---|---|---|---|
| | | | Dry | Wet |
| 1 | 1400FR* | No facing delamination | Passed | Passed |
| 2 | 475FRK-** | | Passed | Passed |

| Sample Number | Product | Corrosion | | Results |
|---|---|---|---|---|
| | | Number of spots in 49 in. sq. | Avg. Size of five spots,*** | |
| 1 | 1400FR* | 2 | 0.000 | Passed |
| 2 | 475FRK-** | 0 | 0.000 | Passed |

Note:
The facing on all FR boards looked excellent, very few wrinkles.
*6¼#/cu.ft. duct board, foil reinforced, min.; average structural rigidity = 1400 in.² lbs./in. of width
**Foil Reinforced Kraft. OCF Standard Product
***Spot size is determined by diameter of circle in inches which completely encloses the spot.

In the Peel Adhesion Test for which data are set forth above, the facing is stripped from a full board. The percent of the facing area covered with fiber glass is estimated. For satisfactory results, a minimum of 50 percent wool coverage, overall and along the edges, is required.

In the Cold Temperature Adhesion Test, 12 inch×48 inch specimens are placed in a 0° F. environment and allowed to reach a stable temperature. The facing is rubbed with a blunt object, then peeled and inspected. The percent of the facing area covered with glass fiber is visually estimated. A minimum of 50 percent coverage is required. There shall be no evidence of degradation in the bond between the facing and the fiber glass.

In the Corrosion Test, a 7 inch×7 inch wire grid divided into 1 square areas is placed anywhere on a sample consisting of two 16 inch×16 inch pieces of duct board cut from the center of a full board. The outline of the grid is marked on the samples and orientation of the grid is noted.

Using the grid, the number of certain and possible corrosion spots in the center 49 one inch square is counted and noted.

True corrosion spots outside of the grid area on both specimens are circled and numbered. Using an Edmund Scientific Junior Comparator, there is measured the longest dimension in inches and best fit circle of the 5 target spots. The longest dimension is defined as the longest possible measurement taken from any edge of a corrosion spot along a line to the other edge of the spot.

1. The wire grid is placed anywhere on the surface of each specimen and the outline of the grid is drawn. The grid is marked so that it can be oriented the same later.

2. Using the grid, the number of certain and possible corrosion spots is counted in the center 49 one inch squares and the numbers are recorded on the data sheet.

3. Five corrosion spots outside the grid area on both specimens are circled and numbered. Using the comparator, the longest dimension and best fit circle of the 5 target spots is measured. The longest dimension is defined as the longest possible measurement taken from any edge of a corrosion spot along a line to the other edge of the spot. The best fit circle is defined to be the smallest circle which will entirely contain the spot. The spot should not extend outside the circle in any place. If the spots become larger than those engraved on the comparator, record the symbol > (greater than) and the largest circle. Note: If no spots exist before exposure use spots after exposure.

4. One of the specimens is placed in the humidity cabinet (120° F., 95% RH) and one in the constant temperature room (70° F., 50% RH) for control.

5. Every morning on working days, the specimen is removed from the humidity cabinet. It is allowed to condition in the constant temperature room for ½ hour. The measurement part of steps 2 and 3 is repeated on exposed specimen and control specimen. The exposed specimen is returned to the humidity cabinet.

6. Every evening on working days the specimen is removed from the humidity cabinet, and allowed to condition for one half hour in the constant temperature room. It is then returned to the humidity cabinet.

7. The test is continued for specified time period or until the number and size of the spots remain constant.

Data included in a Report are:
1. Total increase in positive and possible corrosion spots.
2. Total exposure time.
3. Plot increase in size versus time.
4. Plot increase in number versus time.

The duct board suction box, dry, test provides a procedure to determine the creep resistance of the facing adhesive used in duct board. It is conducted by clamping a specimen such that vacuum of 3" H₂O is applied for a period of 48 hours at a temperature of 130° F. to the facing, or foil side, of the duct board. The facing is then observed for ballooning.

Failure is defined as an area of delamination equivalent to a six inch diameter circle.

The duct board suction box, wet, test provides a procedure to determine moisture sensitivity of the facing adhesive used in duct board. It is conducted by adjusting the flow of water over the duct board to a flow of 20 GPH and observing the facing for failure at 15 minute intervals for a period of one hour.

Failure is defined as an area of delamination equivalent to a 6 inch diameter circle.

The wet test is run under the same vacuum conditions as the dry test, as both using water as described.

From the foregoing, it is seen the adhesive exhibits very good bond and fire rating properties.

It will be evident from the foregong that various modifications can be made to this invention. Such, however, are considered within the scope of this invention.

We claim:
1. An adhesive composition comprising a carboxylated vinyl acetate-ethylene latex, a non-carboxylated vinyl acetate-ethylene latex and ammonium dichromate.

2. An adhesive composition comprising a carboxylated vinyl acetate-ethylene latex, a non-carboxylated vinyl acetate-ethylene latex, ammonium dichromate and polyethylene oxide.

3. An adhesive composition comprising a carboxylated vinyl acetate-ethylene latex, a non-carboxylated vinyl acetate-ethylene latex, ammonium dichromate, polyethylene oxide and a 10,10′oxybisphenoxarsine emulsion.

4. An adhesive composition comprising a carboxylated vinyl acetate-ethylene latex, a non-carboxylated vinyl acetate-ethylene latex, ammonium dichromate, polyethylene oxide, 10,10′oxybisphenoxarsine and 2,4,7,9-tetramethyl-5-decyn-4,-7-diol.

5. The composition of claim 1 in which said carboxylated vinyl acetate-ethylene latex is present in an amount within the range of from about 29 to about 67 parts by weight, said non-carboxylated vinyl acetate-ethylene latex is present in an amount within the range of from about 27 to about 64 parts by weight and said ammonium dichromate is present in an amount within the range of from about 0.25 to about 0.75 parts by weight.

6. The composition of claim 2 in which said carboxylated vinyl acetate-ethylene latex is present in an amount within the range of from about 29 to about 67 parts by weight, said non-carboxylated vinyl acetate-ethylene latex is present in an amount within the range of from about 27 to about 64 parts by weight, said ammonium dichromate is present in an amount within the range of from about 0.25 to about 0.75 parts by weight and said polyethylene oxide is present in an amount within the range of from about 3.33 to about 4.8 parts by weight.

7. The composition of claim 3 in which said carboxylated vinyl acetate-ethylene latex is present in an amount within the range of from about 29 to about 67 parts by weight, said non-carboxylated vinyl acetate-ethylene latex is present in an amount within the range of from about 27 to about 64 parts by weight, said ammonium dichromate is present in an amount within the range of from about 0.25 to about 0.75 parts by weight, said polyethylene oxide is present in an amount within the range of from about 3.33 to about 4.8 parts by weight and said 10,10′oxybisphenoxarsine emulsion is present in an amount within the range of from about 0.85 to about 0.95 parts by weight.

8. The composition of claim 3 in which said carboxylated vinyl acetate-ethylene latex is present in an amount within the range of from about 29 to about 67 parts by weight, said non-carboxylated vinyl acetate-ethylene latex is present in an amount within the range of from about 27 to about 64 parts by weight, said ammonium dichromate is present in an amount within the range of from about 0.25 to about 0.75 parts by weight, said polyethylene oxide is present in an amount within the range of from about 3.33 to about 4.8 parts by weight, said 10,10′-oxybisphenoxarsine is present in an amount within the range of from about 0.85 to about 0.95 parts by weight and said 2,4,7,9-tetramethyl-5-decyn-4,-7 diol is present in an amount within the range of from about 0.57 to about 0.77 parts by weight.

* * * * *